(12) United States Patent
Lee et al.

(10) Patent No.: US 11,406,963 B2
(45) Date of Patent: Aug. 9, 2022

(54) SUPERABSORBENT POLYMER AND PREPARATION METHOD THEREOF

(71) Applicant: LG Chem, Ltd., Seoul (KR)

(72) Inventors: Hyemin Lee, Daejeon (KR); Jungmin Sohn, Daejeon (KR); Yeonsoo Kim, Daejeon (KR)

(73) Assignee: LG Chem, Ltd.

( * ) Notice: Subject to any disclaimer, the term of this patent is extended or adjusted under 35 U.S.C. 154(b) by 263 days.

(21) Appl. No.: 16/475,940

(22) PCT Filed: Nov. 14, 2018

(86) PCT No.: PCT/KR2018/013917
§ 371 (c)(1),
(2) Date: Jul. 3, 2019

(87) PCT Pub. No.: WO2019/117482
PCT Pub. Date: Jun. 20, 2019

(65) Prior Publication Data
US 2019/0344243 A1    Nov. 14, 2019

(30) Foreign Application Priority Data

Dec. 15, 2017  (KR) .................. 10-2017-0173553
Nov. 13, 2018  (KR) .................. 10-2018-0139102

(51) Int. Cl.
  *B01J 20/26* (2006.01)
  *B01J 20/28* (2006.01)
  *B01J 20/30* (2006.01)

(52) U.S. Cl.
  CPC ....... *B01J 20/267* (2013.01); *B01J 20/28004* (2013.01); *B01J 20/28016* (2013.01); *B01J 20/3021* (2013.01); *B01J 20/3064* (2013.01); *B01J 20/3085* (2013.01)

(58) Field of Classification Search
  None
  See application file for complete search history.

(56) References Cited

U.S. PATENT DOCUMENTS

| | | | |
|---|---|---|---|
| 4,973,632 | A | 11/1990 | Nagasuna et al. |
| 5,562,646 | A | 10/1996 | Goldman et al. |
| 6,133,193 | A | 10/2000 | Kajikawa et al. |
| 9,700,873 | B2 | 7/2017 | Lee et al. |
| 10,023,703 | B2 | 7/2018 | Lee et al. |
| 10,208,171 | B2 | 2/2019 | Lee et al. |
| 2003/0045847 | A1 | 3/2003 | Whitmore et al. |
| 2012/0258851 | A1 | 10/2012 | Nakatsuru et al. |
| 2013/0158495 | A1 | 6/2013 | Handa et al. |
| 2014/0312273 | A1 | 10/2014 | Wattebled et al. |
| 2015/0283284 | A1 | 10/2015 | Azad et al. |
| 2015/0315321 | A1 | 11/2015 | Won et al. |
| 2016/0096944 | A1 | 4/2016 | Wattebled et al. |
| 2016/0208035 | A1 | 7/2016 | Ryu et al. |
| 2016/0318002 | A1 | 11/2016 | Lee et al. |
| 2017/0189575 | A1 | 7/2017 | Lee et al. |
| 2018/0071714 | A1 | 3/2018 | Torii et al. |
| 2018/0312645 | A1 | 11/2018 | Lee et al. |
| 2018/0318793 | A1 | 11/2018 | Yoon et al. |

FOREIGN PATENT DOCUMENTS

| | | |
|---|---|---|
| CN | 105377921 A | 3/2016 |
| CN | 105916902 A | 8/2016 |
| EP | 0789047 A1 | 8/1997 |
| EP | 2518092 A1 | 10/2012 |
| EP | 3070107 A1 | 9/2016 |
| EP | 3112383 A1 | 1/2017 |
| EP | 3192826 A1 | 7/2017 |
| EP | 3249001 A1 | 11/2017 |
| JP | H02196802 A | 8/1990 |
| JP | 2002284803 A | 10/2002 |
| JP | 3481250 B2 | 12/2003 |
| JP | 2006068731 A | 3/2006 |
| JP | 4921672 B2 | 4/2012 |
| JP | 5647625 B2 | 1/2015 |
| JP | 2016055193 A | 4/2016 |
| JP | 2016516877 A | 6/2016 |
| JP | 2016132778 A | 7/2016 |

(Continued)

OTHER PUBLICATIONS

Chinese Search Report for Application No. 201880005698.2 dated Jul. 5, 2021, pp. 1-3.
George Odian, Principles of Polymerization, 1981, p. 203, Wiley, United States of America.
International Search Report including Written Opinion for Application No. KR2018/013917 dated Mar. 11, 2019, pp. 1-12.
Reinhold Schwalm, UV Coatings Basics, Recent Developments and New Applications, (book), Dec. 2016, p. 115, Elsevier Science.
Database WPI Week 201604 2015 Thomson Scientific, London, GB; AN 2015-755192, XP002797260.
Extended European Search Report including the Written Opinion for Application No. EP 18884837.8 dated Feb. 11, 2020, 14 pages.
Third Party Observation for Application No. PCT/KR2018/013917 submitted Feb. 5, 2020, 8 pages.

(Continued)

*Primary Examiner* — Tanisha Diggs
(74) *Attorney, Agent, or Firm* — Lerner, David, Littenberg, Krumholz & Mentlik, LLP

(57) ABSTRACT

Provided are a superabsorbent polymer exhibiting more improved absorption rate and liquid permeability as well as excellent basic absorption performance, and a preparation method thereof. The superabsorbent polymer includes a base polymer powder including a crosslinked polymer of water-soluble ethylene-based unsaturated monomers having acidic groups which are at least partially neutralized; and a surface crosslinked layer which is formed on the base polymer powder and in which the base polymer powder is additionally crosslinked via a surface crosslinking agent, wherein the superabsorbent polymer includes 10% by number or more of superabsorbent polymer particles each particle having an aspect ratio of less than 0.5, the aspect ratio defined as the shortest diameter/the longest diameter of the superabsorbent polymer particle, and has SFC in a predetermined range.

17 Claims, 1 Drawing Sheet

(56) References Cited

FOREIGN PATENT DOCUMENTS

| | | |
|---|---|---|
| JP | 2016524634 A | 8/2016 |
| JP | 2017517600 A | 6/2017 |
| KR | 20150132035 A | 11/2015 |
| KR | 20160010516 A | 1/2016 |
| KR | 20160063975 A | 6/2016 |
| KR | 101684649 B1 | 12/2016 |
| KR | 20160144611 A | 12/2016 |
| KR | 20170106156 A | 9/2017 |
| KR | 20170112856 A | 10/2017 |
| WO | 2012033025 A1 | 3/2012 |
| WO | 2016159144 A1 | 10/2016 |

OTHER PUBLICATIONS

G.H. Bagheri e al., "Powder Technology", On the characterization of size and shape of irregular particles, Powder Technology, vol. 270, (Jan. 2015). 52 pgs.

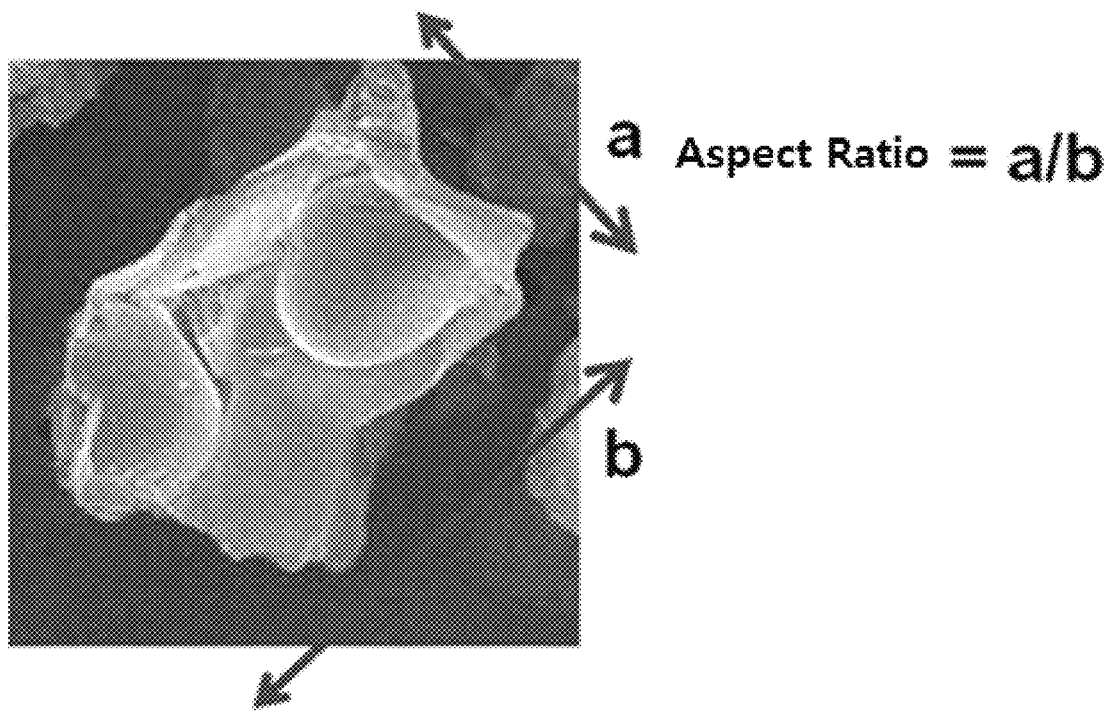

SUPERABSORBENT POLYMER AND PREPARATION METHOD THEREOF

CROSS-REFERENCE TO RELATED APPLICATIONS

This application is a national phase entry under 35 U.S.C. § 371 of International Application No. PCT/KR2018/013917 filed Nov. 14, 2018, which claims priority to Korean Patent Application No 10-2017-0173553 filed Dec. 15, 2017, and Korean Patent Application No. 10-2018-0139102 filed Nov. 13, 2018, the disclosures of which are incorporated herein by reference.

TECHNICAL FIELD

The present invention relates to a superabsorbent polymer exhibiting more improved absorption rate and liquid permeability as well as excellent basic absorption performances, and a preparation method thereof.

BACKGROUND

A superabsorbent polymer (SAP) is a synthetic polymeric material capable of absorbing moisture from about 500 to 1000 times its own weight. Various manufacturers have given it different names, such as SAM (Super Absorbency Material), AGM (Absorbent Gel Material), etc. Such superabsorbent polymers started to be practically applied in sanitary products, and now they are widely used not only for hygiene products such as disposable diapers for children, etc., but also for water retaining soil products for gardening, water stop materials for civil engineering and construction, sheets for raising seedling, fresh-keeping agents for food distribution fields, materials for poultices, etc.

In most cases, these superabsorbent polymers have been widely used in the field of hygienic materials such as diapers, sanitary napkins, etc. For these applications, superabsorbent polymers are required to exhibit high absorbency with respect to water, etc., must not release absorbed water even under an external pressure, and also must maintain their shape under volume expansion (swelling) after water absorption to show excellent permeability.

Recently, with increasing demand for thin diapers, the content of fibrous materials such as pulp, etc. tends to decrease and the proportion of the superabsorbent polymer tends to relatively increase in the diapers. Therefore, the superabsorbent polymer needs to have the performance of the fibrous materials in the diapers. To achieve this, the superabsorbent polymer should have high absorption rate and liquid permeability as well as high absorbency. Particularly, as diapers become thinner, there is an increasing concern about leakage of the urine from the diaper according to the movement of a baby who is the user of the diaper, and accordingly, the superabsorbent polymer is increasingly required to have the high absorption rate.

Meanwhile, in order for the superabsorbent polymer to exhibit the above-mentioned high liquid permeability, even after the superabsorbent polymer particles are swollen by absorbing moisture, the superabsorbent polymer needs to retain in its shape, thereby maintaining voids between particles. This is because voids between the particles act as a flow path to ensure excellent liquid permeability of the superabsorbent polymer. For this reason, in order to provide a superabsorbent polymer exhibiting more improved liquid permeability and other excellent physical properties, such a superabsorbent polymer needs to exhibit a higher gel strength through surface crosslinking, etc.

Further, to exhibit the higher absorption rate, the superabsorbent polymer needs to have a porous structure having a large surface area and a large number of pores formed inside thereof. Previously, superabsorbent polymers having such a porous structure have been prepared by applying a foaming agent, etc. However, this superabsorbent polymer is likely to be uneven in the particle shape after pulverization. Therefore, when surface crosslinking is performed after pulverization or when an additive, etc. is mixed to improve physical properties, uneven surface crosslinking may occur or uneven coating of the additive may occur in many cases. As a result, in the previous technology of realizing the high absorption rate of the superabsorbent polymer by forming the porous structure, etc., other physical properties such as liquid permeability, absorption performances, etc. have been frequently deteriorated.

Accordingly, there is a continuous demand for the development of a technology capable of providing a superabsorbent polymer exhibiting more improved liquid permeability and absorption rate while maintaining excellent absorption performances.

Technical Problem

The present invention provides a superabsorbent polymer exhibiting more improved absorption rate and liquid permeability as well as excellent basic absorption performances, and a preparation method thereof.

Technical Solution

The present invention provides a superabsorbent polymer including: a base polymer powder including a first cross-linked polymer of water-soluble ethylene-based unsaturated monomers having acidic groups which are at least partially neutralized; and a surface crosslinked layer which is formed on the base polymer powder and includes a second cross-linked polymer in which the first crosslinked polymer is additionally cross-linked via a surface crosslinking agent, wherein the superabsorbent polymer includes 10% by number or more of superabsorbent polymer particles each particle having an aspect ratio of less than 0.5, the aspect ratio defined as the shortest diameter/the longest diameter of the superabsorbent polymer particle, and the superabsorbent polymer has a saline (0.685% by weight of an aqueous solution of sodium chloride) flow conductivity (SFC; $\cdot 10^{-7}$ cm$^3$·s/g) of 30($\cdot 10^{-7}$ cm$^3$·s/g) or more.

Further, the present invention provides a method of preparing the superabsorbent polymer, the method including the steps of:

carrying out a crosslinking polymerization of water-soluble ethylene-based unsaturated monomers having acidic groups which are at least partially neutralized, in the presence of a foaming agent and an internal crosslinking agent to form a water-containing gel polymer including a first cross-linked polymer;

gel-pulverizing, drying, pulverizing, and size-sorting the water-containing gel polymer to form a base polymer including 10% by number or more of base polymer powder having an aspect ratio of less than 0.5, the aspect ratio defined as the shortest diameter/the longest diameter; and carrying out a surface crosslinking of the base polymer by heat treatment in the presence of a surface crosslinking liquid containing a surface crosslinking agent and a liquid medium and having a surface tension of 30 mN/m to 50 mN/m at a temperature of 20° C. to 25° C.

Hereinafter, a superabsorbent polymer according to specific embodiments of the present invention and a preparation method thereof will be described in more detail. However, they are merely presented as an example of the present invention, and it will be apparent to those skilled in the art that the scope of the present invention is not limited to these embodiments, and various modifications may be made to the embodiments within the scope of the present invention.

Additionally, unless stated otherwise throughout this specification, the term "comprising" or "including" means to include any element (or component) without particular limitation, and it may not be interpreted as a meaning of excluding addition of another element (or component).

According to one embodiment of the present invention, the present invention provides a superabsorbent polymer including a base polymer powder including a first crosslinked polymer of water-soluble ethylene-based unsaturated monomers having acidic groups which are at least partially neutralized; and a surface crosslinked layer which is formed on the base polymer powder and includes a second crosslinked polymer in which the first crosslinked polymer is additionally crosslinked via a surface crosslinking agent, wherein the superabsorbent polymer includes 10% by number or more of superabsorbent polymer particles each particle having an aspect ratio of less than 0.5, the aspect ratio defined as the shortest diameter/the longest diameter of the superabsorbent polymer particle, and the superabsorbent polymer has a saline (0.685% by weight of an aqueous solution of sodium chloride) flow conductivity (SFC; $\cdot 10^{-7}$ cm$^3 \cdot$s/g) of 30($\cdot 10^{-7}$ cm$^3 \cdot$s/g) or more.

As a result of continuous studies, the present inventors found that when particles having a high aspect ratio are obtained in a predetermined level or more in the presence of a foaming agent, etc. during a crosslinking polymerization according to the preparation method described below, and then a surface crosslinking process is performed using a surface crosslinking liquid having a reduced surface tension, it is possible to prepare and provide a superabsorbent polymer having improved liquid permeability and absorption rate as well as excellent basic absorbency, thereby completing the present invention.

Basically, since the superabsorbent polymer of one embodiment may be obtained by foaming polymerization using a foaming agent, etc. during the polymerization process, the base polymer powder and superabsorbent polymer particles after pulverization may be allowed to have a low aspect ratio and a large surface area. For example, the superabsorbent polymer may be prepared to include 10% by number or more, 10% by number to 60% by number, or 10% by number to 50% by number of the superabsorbent polymer particles each particle having an aspect ratio of less than 0.5, the aspect ratio defined as the shortest diameter/the longest diameter of the superabsorbent polymer particle.

As such, during the preparation process of the superabsorbent polymer, the base polymer powder and superabsorbent polymer particles are obtained such that they include particles having a low aspect ratio at a predetermined level or more and their surface area is increased, and as a result, the superabsorbent polymer of one embodiment may exhibit a higher absorption rate, etc.

However, when particles having a low aspect ratio are formed at a predetermined level or more, the shape of the particles is uneven, and thus it is difficult to evenly perform the subsequent surface crosslinking. As a result, it is difficult to improve absorbency under pressure and liquid permeability of the superabsorbent polymer at the same time. This is because surface crosslinking of particles having a low aspect ratio unevenly occurs, as compared with that of particles having an aspect ratio close to 1.

However, according to continuous experimental results of the present inventors, it was found that when a surface crosslinking liquid having a relatively low surface tension is obtained by a method described below, and then surface crosslinking is performed using the same, a surface crosslinked layer having excellent surface crosslinking degree and strength may be evenly formed on the base polymer powder including the particles having a low aspect ratio at a predetermined level or more. This is presumably because the penetration of the surface crosslinking liquid may be relatively shallow and uniformly controlled.

Accordingly, the superabsorbent polymer of one embodiment may exhibit the excellent absorption rate and more improved liquid permeability and absorbency under pressure. The improved liquid permeability of the superabsorbent polymer of one embodiment may be defined by the above range of SFC.

Therefore, unlike conventional common sense that it is difficult to improve the absorption rate and liquid permeability at the same time, the superabsorbent polymer of one embodiment may exhibit both more improved absorption rate and liquid permeability while maintaining excellent basic absorption performances, thereby being suitably applied to sanitary materials such as thinner diapers, etc.

Hereinafter, the superabsorbent polymer of one embodiment will be described in more detail.

The 'superabsorbent polymer', as used herein, refers to a superabsorbent polymer including a base polymer powder including a first crosslinked polymer of water-soluble ethylene-based unsaturated monomers having acidic groups which are at least partially neutralized; and a surface crosslinked layer which is formed on the base polymer powder and includes a second cross-linked polymer in which the first crosslinked polymer is additionally crosslinked via a surface crosslinking agent.

The water-soluble ethylene-based unsaturated monomer may be any monomer commonly used in the preparation of superabsorbent polymers. For non-limiting example, the water-soluble ethylene-based unsaturated monomer may be a compound represented by the following Chemical Formula 1:

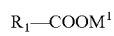   [Chemical Formula 1]

in Chemical Formula 1, $R_1$ is an alkyl group having 2 to 5 carbon atoms and containing an unsaturated bond, and $M^1$ is a hydrogen atom, a monovalent or divalent metal, an ammonium group, or an organic amine salt.

Appropriately, the monomer may be one or more selected from the group consisting of acrylic acid, methacrylic acid, and a monovalent metal salt, a divalent metal salt, an ammonium salt, and an organic amine salt thereof. When acrylic acid or a salt thereof is used as the water-soluble ethylene-based unsaturated monomer, it is advantageous in terms of obtaining the superabsorbent polymer having improved absorbency. In addition, the monomer may include one or more selected from the group consisting of an anionic monomer such as maleic anhydride, fumaric acid, crotonic acid, itaconic acid, 2-acryloylethane sulfonic acid, 2-methacryloylethane sulfonic acid, 2-(meth)acryloylpropane sulfonic acid, or 2-(meth)acrylamide-2-methyl propane sulfonic acid, and salts thereof; a nonionic hydrophilic monomer such as (meth)acrylamide, N-substituted (meth)acrylate, 2-hydroxyethyl(meth)acrylate, 2-hydroxypropyl (meth)acrylate, methoxy polyethylene glycol (meth)acrylate, or polyethylene glycol (meth)acrylate; and an amino group-containing unsaturated monomer such as (N,N)-dimethylaminoethyl(meth)acrylate or (N,N)-dimethylaminopropyl(meth)acrylate, and a quaternary compound thereof.

Here, the water-soluble ethylene-based unsaturated monomer may have acidic groups which are at least partially neutralized. Preferably, those partially neutralized with an alkali substance such as sodium hydroxide, potassium hydroxide, ammonium hydroxide or the like may be used.

In this regard, a neutralization degree of the monomer may be about 40 mol % to 95 mol %, or 40 mol % to 80 mol %, or 45 mol % to 75 mol %. The range of the neutralization degree may vary depending on the final physical properties. An excessively high degree of neutralization renders the neutralized monomers precipitated, and thus polymerization may not occur readily, whereas an excessively low degree of neutralization not only deteriorates the absorbency of the polymer but also endows the polymer with hard-to-handle properties, such as of elastic rubber.

The 'first crosslinked polymer' refers to a product obtained by crosslinking polymerization of the above-described water-soluble ethylene-based unsaturated monomer in the presence of an internal crosslinking agent, and the 'base polymer powder' refers to a substance including the first crosslinked polymer. Further, the 'second crosslinked polymer' refers to a substance obtained by additionally crosslinking the first crosslinked polymer via a surface crosslinking agent, and accordingly, formed on the base polymer powder. The surface crosslinking agent will be described below.

As described above, the superabsorbent polymer of one embodiment may be provided such that the base polymer powder and the superabsorbent polymer particles have a relative low aspect ratio by obtaining the base polymer powder by foaming polymerization. More specifically, the superabsorbent polymer of one embodiment may include a large number of the superabsorbent polymer particles, for example, 10% by number or more, 10% by number to 80% by number, 10% by number to 70% by number, 10% by number to 60% by number, or 10% by number to 50% by number of the superabsorbent polymer particle having an aspect ratio of less than 0.5, the aspect ratio defined as the shortest diameter/the longest diameter of the superabsorbent polymer particle, based on the total number of the superabsorbent polymer particles.

In this regard, the aspect ratio of the base polymer powder and the superabsorbent polymer particle may be calculated from, for example, the shortest diameter (a) and the longest diameter (b) which are obtained by analyzing each particle by electron microscopy, as shown in FIG. 1. From the calculated aspect ratio data of respective particles, % by number of the particles having the aspect ratio of less than 0.5 may be calculated. For reference, it is confirmed that the aspect ratios of the base polymer powder and the superabsorbent polymer particle are equivalent to each other.

Since the superabsorbent polymer of one embodiment may include the particles having the low aspect ratio at a predetermined level or more, a number of micropores may be formed between the base polymer powder and the superabsorbent polymer particles. When the surface crosslinked layer is formed on the porous particles, a large amount of water may be rapidly absorbed between the micropores, and therefore, the superabsorbent polymer of one embodiment may exhibit higher absorption rate and absorption performances (centrifuge retention capacity, etc.).

Meanwhile, the above-described superabsorbent polymer of one embodiment may be excellent in terms of basic absorption performances under no pressure or under pressure, absorption rate, and liquid permeability, which may be defined by physical properties such as CRC, AUP, absorbency, SFC, 30-sec absorption rate, surface tension, etc.

Specifically, centrifuge retention capacity (CRC) of the superabsorbent polymer of one embodiment for a physiological saline solution (0.9 wt % aqueous solution of sodium chloride) for 30 minutes may be 25 g/g to 35 g/g, or 26 g/g to 33 g/g. The range of the centrifuge retention capacity (CRC) may define excellent absorption performance under no pressure which is exhibited by the superabsorbent polymer of one embodiment.

The centrifuge retention capacity (CRC) for the physiological saline solution may be calculated by the following Calculation Formula 1, after immersing the superabsorbent polymer in the physiological saline solution for 30 minutes:

$$CRC(g/g)=\{[W_2(g)-W_1(g)-W_0(g)]/W_0(g)\} \quad \text{[Calculation Formula 1]}$$

in Calculation Formula 1, $W_0(g)$ is an initial weight (g) of the superabsorbent polymer, $W_1(g)$ is a weight which is measured after immersing a nonwoven-fabric-made bag including no superabsorbent polymer in the physiological saline solution at room temperature for 30 min and draining water off using a centrifuge at 250 G for 3 min, and $W_2(g)$ is a weight which is measured after immersing a nonwoven-fabric-made bag including the superabsorbent polymer in the physiological saline solution at room temperature for 30 min and draining water off using a centrifuge at 250 G for 3 min.

Further, absorbency under pressure (AUP) of 0.7 psi of the superabsorbent polymer of one embodiment for a physiological saline solution (0.9 wt % aqueous solution of sodium chloride) for 1 hour may be 21 g/g to 27 g/g, or 21.5 g/g to 26 g/g. The range of the absorbency under pressure (AUP) may define excellent absorption performance under pressure which is exhibited by the superabsorbent polymer of one embodiment.

The absorbency under pressure (AUP) may be calculated by the following Calculation Formula 2, after immersing the superabsorbent polymer in the physiological saline solution under a pressure of 0.7 psi for 1 hour:

$$AUP(g/g)=[W_4(g)-W_3(g)]/W_0(g) \quad \text{[Calculation Formula 2]}$$

in Calculation Formula 2, $W_0(g)$ is an initial weight (g) of the superabsorbent polymer, $W_3(g)$ is the total sum of the weight of the superabsorbent polymer and a weight of an apparatus capable of providing a load for the superabsorbent polymer, and $W_4(g)$ is the total sum of the weight of the superabsorbent polymer and the weight of the apparatus capable of providing a load to the superabsorbent polymer, after immersing the superabsorbent polymer in the physiological saline solution under a load (0.7 psi) for 1 hour.

Further, as the superabsorbent polymer of one embodiment exhibits the centrifuge retention capacity (CRC) and the absorbency under pressure (AUP) in the above ranges, the superabsorbent polymer may have absorbency of 46 g/g to 63 g/g or 47 g/g to 60 g/g, which is defined by the following Equation 1:

$$\text{Absorbency}=CRC+AUP \quad \text{[Equation 1]}$$

in Equation 1, CRC is centrifuge retention capacity of the superabsorbent polymer for the physiological saline solution (0.9 wt % aqueous solution of sodium chloride) for 30 minutes, and represents centrifuge retention capacity calculated by Calculation Formula 1, and AUP is absorbency under pressure (AUP) of 0.7 psi of the superabsorbent polymer for the physiological saline solution (0.9 wt % aqueous solution of sodium chloride) for 1 hour, and represents absorbency under pressure calculated by Calculation Formula 2.

Accordingly, the superabsorbent polymer of one embodiment may exhibit excellent basic absorption performances such as absorbency and absorbency under pressure, thereby being suitably applied to a variety of sanitary materials.

Further, saline (0.685 wt % aqueous solution of sodium chloride) flow conductivity (SFC, $10^{-7}$ cm$^3$·s/g) of the superabsorbent polymer of one embodiment may be 30($\cdot 10^{-7}$ cm$^3$·s/g) or more, 35($\cdot 10^{-7}$ cm$^3$·s/g) or more, 40($\cdot 10^{-7}$ cm$^3$·s/g) to 150($\cdot 10^{-7}$ cm$^3$·s/g), or 42($\cdot 10^{-7}$ cm$^3$·s/g) to 130($\cdot 10^{-7}$ cm$^3$·s/g).

The saline flow conductivity (SFC) may be measured and calculated according to a method previously known to those skilled in the art, for example, a method disclosed in column 54 to column 59 of U.S. Pat. No. 5,562,646.

Since the superabsorbent polymer may include the base polymer powder which maintains a high gel strength and may evenly include the surface crosslinked layer having an excellent strength which is formed by surface crosslinking of the base polymer powder under particular conditions, the superabsorbent polymer may have an overall high gel strength, and accordingly, may exhibit more improved saline flow conductivity (SFC) and excellent liquid permeability.

Further, the superabsorbent polymer of one embodiment may be prepared/provided by using a surface crosslinking liquid having a low surface tension described below, and thus the superabsorbent polymer in itself may have a surface tension of 60 mN/m to 75 mN/m or 60 mN/m to 73 mN/m.

The surface tension may be measured, for example, by using a tensiometer at room temperature of 23±2° C. A specific method of measuring the surface tension is described in Examples below.

The surface tension of the superabsorbent polymer may be a physical property distinguished from centrifuge retention capacity, absorbency under pressure, liquid permeability, etc., and may be a measure for evaluating urine leakage from a diaper including the superabsorbent polymer. The surface tension refers to a surface tension which is measured with respect to a saline solution after swelling the superabsorbent polymer in the saline solution. When the surface tension of the superabsorbent polymer is low, there is a high possibility of urine leakage from diapers including the superabsorbent polymer. The superabsorbent polymer of one embodiment may have a proper range of surface tension while maintaining a high liquid permeability, and thus possibility of leakage may be reduced, thereby producing high-quality sanitary products.

When the surface tension of the superabsorbent polymer is too low, urine leakage, that is, rewetting may be increased. When the surface tension is too high, the surface crosslinked layer may be unevenly formed, and thus physical properties such as liquid permeability, etc. may deteriorate.

Meanwhile, the above-described superabsorbent polymer of one embodiment may have a 30-sec absorption rate of 1.5 mm/min or more, or 1.7 mm/min to 3.0 mm/min, or 1.8 mm/min to 2.6 mm/min, when about 0.16 g of the superabsorbent polymer is swollen under a pressure of 0.3 psi by a physiological saline solution introduced through a mesh in the bottom of a cylindrical cylinder. The 30-sec absorption rate may be measured and calculated by dividing a change of a height of an upper plate of a rheometer according to volume expansion of the superabsorbent polymer by the absorption time (30 sec).

The superabsorbent polymer may exhibit a high gel strength and excellent liquid permeability while having a porous structure inside thereof by controlling particle distribution during the preparation process, and therefore, it may also exhibit excellent absorption rate defined by the above-described range of 30-sec absorption rate. Accordingly, the superabsorbent polymer may be preferably used inside sanitary products having a reduced content of a fibrous material such as pulp, etc.

Meanwhile, in the above-described superabsorbent polymer of one embodiment, the first crosslinked polymer included in the base polymer powder may be a polymer obtained by crosslinking polymerization of the monomer in the presence of a first internal crosslinking agent of poly (meth)acrylate of polyol selected from the group consisting of trimethylolpropane tri(meth)acrylate, ethylene glycol di(meth)acrylate, polyethylene glycol di(meth)acrylate, propylene glycol di(meth)acrylate, polypropylene glycol di(meth)acrylate, butanediol di(meth)acrylate, butylene glycoldi (meth)acrylate, diethylene glycol di(meth)acrylate, hexanediol di(meth)acrylate, triethylene glycol di(meth) acrylate, tripropylene glycol di(meth)acrylate, tetraethylene glycol di(meth)acrylate, dipentaerythritol pentacrylate, glycerin tri(meth)acrylate and pentaerythritol tetraacrylate; and a second internal crosslinking agent of allyl(meth) acrylate. By applying two or more kinds of the particular internal crosslinking agents, the superabsorbent polymer of one embodiment may maintain a high gel strength even after gel pulverization and pulverization, thereby exhibiting more excellent liquid permeability and absorption performances under pressure, etc.

Further, in the above-described superabsorbent polymer, two or more kinds of alkylene carbonates having 2 to 5 carbon atoms, in which the two or more kinds of the alkylene carbonates have different carbon numbers, may be used as the surface crosslinking agent during surface crosslinking, which will be described in more detail below. Accordingly, the superabsorbent polymer may include the surface crosslinked layer including the crosslinked structure which is obtained via plural kinds of the surface crosslinking agents.

The surface crosslinking liquid including the surface crosslinking agent and liquid medium may further include a surfactant, a predetermined polycarboxylic acid-based copolymer, an aliphatic alcohol having 6 or more carbon atoms, etc. The surface tension of the surface crosslinking liquid may be achieved in a particular relatively low range by the use of the plural kinds of the surface crosslinking agents and the additional components optionally included in the surface crosslinking liquid, thereby finally preparing and providing the superabsorbent polymer having the above-described physical properties.

Meanwhile, the above-described superabsorbent polymer of one embodiment may have a particle size of 150 μm to 850 μm. More specifically, 95% by weight or more of the base polymer powder and the superabsorbent polymer including the same may have a particle size of 150 μm to 850 μm, and fine powder having a particle size of less than 150 μm may be in an amount of less than 5% by weight. In this regard, the particle size of the superabsorbent polymer may be defined by the longest diameter of the above-described superabsorbent polymer particle.

The technical principle by which the superabsorbent polymer satisfying the above-described physical properties of one embodiment may be prepared is as follows.

First, a foaming degree is increased by using a foaming agent, etc. during crosslinking polymerization, thereby forming a water-containing gel polymer including a large number of micropores and a large surface area. When the water-containing gel polymer is subjected to gel pulverization and subsequent pulverization, it is highly probable that the water-containing gel polymer is broken into particles having a low aspect ratio due to the porous property thereof. Accordingly, a base polymer powder having a high content of particles having a low aspect ratio may be prepared.

However, since particles having a low aspect ratio absorb the surface crosslinking liquid at a relatively high absorption rate, they show the penetration pattern of the surface crosslinking liquid and the surface crosslinking degree which are different from those of particles having an aspect ratio close to 1. For this reason, there is a high possibility that uneven crosslinking may occur, which may cause deterioration of liquid permeability, etc. However, as a result of continuous studies of the present inventors, it was found that when the surface tension of the surface crosslinking liquid is relatively lowered, a penetration depth of the surface crosslinking liquid into the base polymer powder becomes relatively low, and thus the surface crosslinking agent may be evenly distributed/penetrated into the entire particles. As a result, liquid permeability of the superabsorbent polymer may be improved, thereby preparing the superabsorbent polymer satisfying all the physical properties of one embodiment.

Based on this technical principle, another embodiment of the present invention provides a method of preparing the superabsorbent polymer.

The preparation method may include the steps of:

carrying out a crosslinking polymerization of water-soluble ethylene-based unsaturated monomers having acidic groups which are at least partially neutralized in the presence of a foaming agent, a surfactant, and an internal crosslinking agent to form a water-containing gel polymer including a first cross-linked polymer;

gel-pulverizing, drying, pulverizing, and size-sorting the water-containing gel polymer to form a base polymer including 10% by number or more of base polymer powder having an aspect ratio of less than 0.5, the aspect ratio defined as the shortest diameter/the longest diameter of the base polymer powder; and carrying out a surface crosslinking of the base polymer by heat treatment in the presence of a surface crosslinking liquid containing a surface crosslinking agent and a liquid medium and having a surface tension of 30 mN/m to 50 mN/m at a temperature of 20° C. to 25° C.

Hereinafter, each step of the preparation method will be described in detail.

First, the preparation method of another embodiment may include the step of forming the water-containing gel polymer by crosslinking polymerization. Specifically, this step is a step of forming the water-containing gel polymer by carrying out thermal polymerization or photo-polymerization of a monomer composition including the water-soluble ethylene-based unsaturated monomer and a polymerization initiator in the presence of the internal crosslinking agent.

The water-soluble ethylene-based unsaturated monomer included in the monomer composition is the same as described above.

Further, the monomer composition may include a polymerization initiator generally used in the preparation of superabsorbent polymers. For non-limiting example, as the polymerization initiator, a thermal polymerization initiator or a photo-polymerization initiator may be used according to the polymerization method. However, even though the photo-polymerization is performed, a certain amount of heat may be generated by UV irradiation or the like, and also generated with the polymerization reaction which is an exothermic reaction. Therefore, the thermal polymerization initiator may be further included.

Here, the photo-polymerization initiator may include, for example, one or more compounds selected from the group consisting of benzoin ether, dialkyl acetophenone, hydroxyl alkylketone, phenyl glyoxylate, benzyl dimethyl ketal, acyl phosphine, and α-aminoketone. Among them, as the specific example of acyl phosphine, commercial Lucirin TPO, namely, 2,4,6-trimethyl-benzoyl-trimethyl phosphine oxide may be used. More various photo-polymerization initiators are well disclosed in "UV Coatings: Basics, Recent Developments and New Application (Elsevier, 2007)" written by Reinhold Schwalm, p115, which may be served as a reference.

Further, the thermal polymerization initiator may include one or more compounds selected from the group consisting of persulfate-based initiators, azo-based initiators, hydrogen peroxide, and ascorbic acid. Specific examples of the persulfate-based initiators may include sodium persulfate ($Na_2S_2O_8$), potassium persulfate ($K_2S_2O_8$), ammonium persulfate (($NH_4)_2S_2O_8$) or the like. Further, specific examples of the azo-based initiators may include 2,2-azobis(2-amidinopropane) dihydrochloride, 2,2-azobis-(N,N-dimethylene) isobutyramidine dihydrochloride, 2-(carbamoylazo)isobutylonitril, 2,2-azobis(2-[2-imidazolin-2-yl]propane) dihydrochloride, 4,4-azobis-(4-cyanovaleric acid) or the like. More various thermal polymerization initiators are well-disclosed in "Principle of Polymerization" written by Odian, (Wiley, 1981), p 203, which may be served as a reference.

The polymerization initiator may be added at a concentration of about 0.001% by weight to 1% by weight, based on the monomer composition. That is, if the concentration of the polymerization initiator is too low, the polymerization rate becomes low, and thus a large amount of residual monomers may be undesirably extracted from the final product. On the contrary, if the concentration of the polymerization initiator is too high, the polymer chains constituting the network becomes short, and thus the content of water-soluble components is increased and physical properties of the polymer may deteriorate such as a reduction in absorbency under pressure.

Meanwhile, the monomer composition may include a crosslinking agent ("internal crosslinking agent") for improving physical properties of the polymer by polymerization of the water-soluble ethylene-based unsaturated monomer. The crosslinking agent is used for internal crosslinking of the water-containing gel polymer, and the crosslinking agent is separately used, independent of a "surface crosslinking agent" described below.

Particularly, in the preparation method of another embodiment, two or more kinds of the above-described internal crosslinking agents, e.g., the first internal crosslinking agent of poly(meth)acrylate of polyol and the second internal crosslinking agent of allyl(meth)acrylate may be used together to obtain the water-containing gel polymer.

More specifically, the first internal crosslinking agent may include one or more selected from the group consisting of trimethylolpropane tri(meth)acrylate, ethylene glycol di(meth)acrylate, polyethylene glycol di(meth)acrylate, propylene glycol di(meth)acrylate, polypropylene glycol di(meth)acrylate, butanediol di(meth)acrylate, butylene glycoldi(meth) acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, and pentaerythritol tetraacrylate, and the second internal crosslinking agent may include allyl(meth)acrylate, allylacrylate, etc.

Further, a total content of the first and second internal crosslinking agents may be 0.01 parts by weight to 2 parts by weight, or 0.05 to 1.8 parts by weight, based on 100 parts by weight of the monomer composition including the internal crosslinking agents and monomer. Further, the first internal crosslinking agent:the second internal crosslinking agent may be used in a weight ratio of 1:1 to 10:1. The superabsorbent polymer satisfying the physical properties of one embodiment may be effectively obtained by controlling the type and content range of the internal crosslinking agents while controlling a water content of the water-containing gel polymer, described below. However, when the content of the internal crosslinking agents is too large, basic absorption performances of the superabsorbent polymer may deteriorate.

Meanwhile, the above-described monomer composition may further include a foaming agent. When the polymerization process is performed by a foaming polymerization process in the presence of the foaming agent, a large number of particles having a low aspect ratio may be formed, and the base polymer powder and the superabsorbent polymer particle having the above-described particle distribution may be obtained.

The foaming agent serves to foam during polymerization to form pores inside the water-containing gel polymer, thereby forming a large number of particles having a low aspect ratio and increasing the surface area. The foaming agent may be carbonate, for example, sodium bicarbonate, sodium carbonate, potassium bicarbonate, potassium carbonate, calcium bicarbonate, calcium carbonate, magnesium bicarbonate, or magnesium carbonate.

Further, the foaming agent may be added at a concentration of about 0.01 parts by weight to about 1.0 parts by weight, or about 0.03 parts by weight to about 0.7 parts by weight, or about 0.05 parts by weight to about 0.6 parts by weight with respect to 100 parts by weight of the acrylic acid-based monomer. When the use of the foaming agent exceeds 1.0 parts by weight, the production process is difficult due to excessive foaming, and the density of the superabsorbent polymer becomes small due to excessive pore formation, which may cause problems in distribution and storage. Further, when the use of the foaming agent is less than 0.01 parts by weight, the role of the foaming agent may be insignificant.

The monomer composition may further include a foam stabilizer to optimize pore formation by the foaming agent. The foam stabilizer plays a role in maintaining the shape of the pores produced by the foaming agent while uniformly distributing pores throughout the polymer, thereby more effectively forming particles having a low aspect ratio and increasing the surface area of the polymer.

As the foam stabilizer, any component which has been previously used as the foam stabilizer in the foaming polymerization of the superabsorbent polymer may be used. For example, cationic, anionic, or non-ionic surfactants may be used.

The foam stabilizer may be added at a concentration of 0.001 parts by weight to 0.1 parts by weight with respect to 100 parts by weight of the acrylic acid-based monomer. When the concentration of the foam stabilizer is too low, the role of stabilizing the foam is insignificant and it is difficult to achieve the effect of improving the absorption rate. On the contrary, when the concentration is too high, the surface tension of the superabsorbent polymer is lowered, and water leakage may occur in the diaper.

Additionally, the monomer composition may further include a thickener, a plasticizer, a preservation stabilizer, an antioxidant, etc., as needed.

The monomer composition may be prepared in the form of a solution in which the raw materials such as the above-described monomer, polymerization initiator, internal crosslinking agent, etc. are dissolved in a solvent.

In this regard, as the applicable solvent, any solvent may be used without limitations in the constitution as long as it is able to dissolve the above raw materials. For example, as the solvent, water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, N,N-dimethylacetamide, or a mixture thereof may be used.

Further, formation of the water-containing gel polymer by polymerization of the monomer composition may be performed by a common polymerization method, and the process is not particularly limited. For non-limiting example, the polymerization method is largely classified into thermal polymerization and photo-polymerization according to a polymerization energy source. The thermal polymerization may be carried out in a reactor like a kneader equipped with agitating spindles, and the photo-polymerization may be carried out in a reactor equipped with a movable conveyor belt.

For example, the monomer composition is injected to a reactor like a kneader equipped with the agitating spindles, and thermal polymerization is performed by providing hot air thereto or by heating the reactor so as to obtain the water-containing gel polymer. In this regard, the water-containing gel polymer may have a size of centimeters or millimeters when it is discharged from an outlet of the reactor, according to the type of agitating spindles equipped in the reactor. Specifically, the water-containing gel polymer may be obtained in various forms according to a concentration of the monomer composition fed thereto, a feeding speed or the like, and the water-containing gel polymer having a (weight average) particle size of 2 mm to 50 mm may be generally obtained.

For another example, when the monomer composition is subjected to photo-polymerization in a reactor equipped with a movable conveyor belt, the water-containing gel polymer may be obtained in a sheet-type. In this regard, the thickness of the sheet may vary according to the concentration of the monomer composition fed thereto and the feeding speed. The sheet is preferably controlled to have a thickness of 0.5 cm to 10 cm in order to assure the production speed while allowing the entire sheet to be uniformly polymerized.

Meanwhile, after forming the water-containing gel polymer by the above-described crosslinking polymerization, the water-containing gel polymer with a controlled water content is subjected to gel pulverization.

A pulverizer applicable in the gel pulverization step may have no limitation in the constitution, but may specifically include any one selected from the group consisting of a vertical pulverizer, a turbo cutter, a turbo grinder, a rotary cutter mill, a cutter mill, a disc mill, a shred crusher, a crusher, a chopper, and a disc cutter, but is not limited thereto.

The gel pulverization of the water-containing gel polymer may be performed such that the diameter of the water-containing gel polymer is 0.01 mm to 50 mm, or 0.01 mm to 30 mm. In other words, the water-containing gel polymer is preferably pulverized into particles of 50 mm or less in order to increase the drying efficiency. However, when excessive pulverization is performed, an aggregation phenomenon between particles may occur, and thus the water-containing gel polymer is preferably pulverized into particles of 0.01 mm or more.

Further, when the gel pulverization of the water-containing gel polymer is performed, the water-containing gel polymer may stick to the surface of the gel pulverizer because it has a relatively low water content. In order to minimize this phenomenon, steam, water, a surfactant, an anti-agglomeration agent (e.g., clay, silica, etc.), a persulfate-based initiator, an azo-based initiator, hydrogen peroxide, a thermal polymerization initiator, an epoxy-based crosslinking agent, a diol-based crosslinking agent, a crosslinking agent including 2-functional or 3 or more-functional acrylate, or a mono-functional crosslinking agent including a hydroxyl group may be added to the water-containing gel polymer, if necessary.

After the above-described gel pulverization, the water-containing gel polymer may be dried. The drying may be performed at a temperature of 120° C. to 250° C., preferably 140° C. to 200° C., and more preferably 150° C. to 200° C. In this regard, the drying temperature is defined as a temperature of a heating medium provided for drying, or an internal temperature of a drying reactor including the heating medium and the polymer during the drying process. If the drying temperature is low and therefore the drying time becomes long, the process efficiency may be decreased. In order to prevent this problem, the drying temperature is preferably 120° C. or higher. In addition, when the drying temperature is higher than necessary, the surface of the water-containing gel polymer is excessively dried, and thus there is a concern about generation of fine particles during the subsequent pulverization process and deterioration of the physical properties of the finally formed polymer. In order to prevent this problem, therefore, the drying temperature is preferably 250° C. or lower.

In this regard, the drying time in the drying step is not particularly limited, but may be controlled to 20 minutes to 90 minutes at the above drying temperature, in consideration of process efficiency and physical properties of the polymer.

The drying may be carried out by using a general medium, and for example, the pulverized water-containing gel polymer may be supplied with hot air, or irradiated with infrared rays, microwaves, ultraviolet rays, or the like.

The drying as above is performed such that the dried polymer may preferably have the water content of about 0.1% by weight to about 10% by weight. In other words, if the water content of the dried polymer is less than 0.1% by weight, production costs may be increased and degradation of the crosslinked polymer may undesirably occur due to excessive drying. If the water content of the dried polymer is more than 10% by weight, the dried polymer adheres in the subsequent process, which may undesirably interfere with a transport path.

After drying, the dried polymer may be pulverized, thereby controlling the particle size and surface area of the polymer in a proper range. The pulverization may be performed such that the particle size of the pulverized polymer is 150 μm to 850 μm. In this regard, the particle size is also defined by the longest diameter of each polymer particle, and the same applies hereinafter.

A milling device applicable herein may include a pin mill, a hammer mill, a screw mill, a roll mill, a disc mill, a jog mill, or the like which is commonly used.

In order to manage physical properties of the superabsorbent polymer finally prepared, a step of selectively size-sorting particles having a particle size of 150 μm to 850 μm from the polymer particles obtained through the pulverization step may be further performed.

Meanwhile, after preparing the base polymer powder through the above-described size-sorting process, the base polymer powder is surface-crosslinked by heat treatment in the presence of a surface crosslinking agent, thereby forming the superabsorbent polymer particles. The surface crosslinking is to induce a crosslinking reaction on the surface of the base polymer powder in the presence of the surface crosslinking agent. Through this surface crosslinking, a surface-modified layer (surface-crosslinked layer) may be formed on the surface of the base polymer powder.

More specifically, in the above-described preparation method of another embodiment, surface crosslinking may be performed by heat treatment using a surface crosslinking liquid including the surface crosslinking agent and liquid medium and having a surface tension of 25 mN/m to 50 mN/m or 30 mN/m to 47 mN/m at a temperature of 20° C. to 25° C.

As such, when the surface crosslinking liquid having the relatively low surface tension is used, surface crosslinking evenly occurs although the particle shape is relatively uneven (a number of particles having a low aspect ratio are included), and therefore, the surface crosslinked layer having excellent crosslinking degree and strength may be uniformly formed, and as relative to absorbency of the superabsorbent polymer, its absorbency under pressure and liquid permeability may be more improved. However, when the surface tension is too low, rewetting of sanitary products may be increased. When a surface crosslinking liquid having a high surface tension is used, the surface crosslinked layer is unevenly formed, and thus physical properties such as absorbency under pressure and liquid permeability may deteriorate, as relative to absorbency.

As described above, in order to obtain the surface crosslinking liquid having such a particular surface tension, two or more kinds of alkylene carbonates having 2 to 5 carbon atoms, in which the two or more kinds of the alkylene carbonates have different carbon numbers, may be used as the surface crosslinking agent.

Further, in order to more effectively achieve the surface tension, the surface crosslinking liquid including the surface crosslinking agent and the liquid medium may further include a surfactant, a polycarboxylic acid-based copolymer having repeating units represented by the following Chemical Formulae 1-a and 1-b, or aliphatic alcohol having 6 or more carbon atoms, optionally. As such, due to use of the plural kinds of the surface crosslinking agents, and optionally, additional components included in the surface crosslinking liquid, the surface crosslinking liquid may have the surface tension in the particular relatively low range, thereby preparing the superabsorbent polymer having the above-described physical properties of one embodiment:

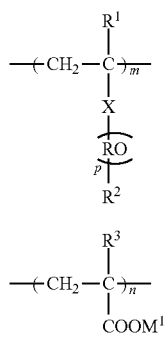

[Chemical Formula 1-a]

[Chemical Formula 1-b]

in Chemical Formulae 1-a and 1-b, $R^1$, $R^2$ and $R^3$ are each independently hydrogen or an alkyl group having 1 to 6 carbon atoms, RO is an oxyalkylene group having 2 to 4 carbon atoms, $M^1$ is hydrogen or a monovalent metal or non-metal ion, X is —COO—, an alkyloxy group having 1 to 5 carbon atoms, or an alkyldioxy group having 1 to 5 carbon atoms, m is an integer of 1 to 100, n is an integer of 1 to 1000, and p is an integer of 1 to 150, wherein when p is two or more, two or more of the repeating —RO— may be the same as or different from each other.

In the surface crosslinking process, plural kinds of alkylene carbonate having 2 to 6 carbon atoms may be used as the surface crosslinking agent, and more suitable examples thereof may include ethylene carbonate, propylene carbonate, butylene carbonate, trimethylene carbonate, glycerol carbonate, etc.

In this regard, a content of the surface crosslinking agent may be appropriately controlled according to the kind or reaction conditions of the crosslinking agent, and preferably, the content may be controlled from 0.001 part by weight to 5 parts by weight with respect to 100 parts by weight of the base polymer powder. When the content of the surface crosslinking agent is too low, surface modification does not occur properly, and thus physical properties of the final polymer may deteriorate. On the contrary, when the surface crosslinking agent is excessively used, excessive surface crosslinking reaction may occur, leading to deterioration in the basic absorbency of the polymer, undesirably.

Further, in order to control the surface tension range of the surface crosslinking liquid, the surface crosslinking liquid may further include a surfactant, and the kind of the surfactant is not particularly limited. In consideration of the kind of the liquid medium included in the surface crosslinking liquid, a nonionic surfactant, an anionic surfactant, or a cationic surfactant may be appropriately selected and used. Accordingly, the surface tension of the surface crosslinking liquid may be further controlled in the above-described range.

For another example, the surface crosslinking liquid may further include the polycarboxylic acid-based copolymer having repeating units represented by the following Chemical Formulae 1-a and 1-b. The polycarboxylic acid-based copolymer is disclosed in U.S. Pat. No. 1,684,649, and a preparation method thereof is apparent to those skilled in the art.

The polycarboxylic acid-based copolymer may be included in an amount of 0.001 part by weight to 5 parts by weight in the surface crosslinking liquid with respect to 100 parts by weight of the base polymer powder, thereby further controlling the surface tension of the surface crosslinking liquid in the above-described range.

Additionally, as another means for controlling the surface tension of the surface crosslinking liquid, an aliphatic alcohol having 6 or more carbon atoms may be further included in the liquid medium of the surface crosslinking liquid, together with a polar solvent such as water or alcohol.

According to an embodiment, aliphatic alcohol having 6 or more carbon atoms may be exemplified by C6 to C20 primary, secondary, or tertiary alcohols, and preferably, C6 to C16 primary alcohols. More preferably, one or more selected from the group consisting of stearyl alcohol, lauryl alcohol, and cetyl alcohol may be used, but is not limited thereto.

A content of the aliphatic alcohol having 6 or more carbon atoms may be about 0.001 part by weight to about 2 parts by weight, or about 0.01 part by weight to about 1 part by weight, preferably about 0.01 part by weight to about 1 part by weight, more preferably about 0.05 parts by weight to about 0.8 parts by weight with respect to 100 parts by weight of the pulverized polymer, i.e., the base polymer powder.

Meanwhile, the surface crosslinking liquid may further include water and/or a hydrophilic organic solvent (e.g., an alcohol-based polar organic solvent such as methanol, etc.) as the liquid medium, together with the above-described components. In this regard, water and the hydrophilic organic solvent may be applied by controlling its addition ratio with respect to 100 parts by weight of the base polymer powder, for the purpose of inducing uniform distribution of the surface crosslinking liquid, preventing the aggregation phenomenon of the base polymer powder, and optimizing the surface penetration depth of the surface crosslinking agent.

With regard to the method of adding the above-described surface crosslinking liquid to the base polymer powder, there is no particular limitation in the constitution. For example, a method of adding and mixing the surface crosslinking liquid and the base polymer powder in a reactor, a method of spraying the surface crosslinking liquid onto the base polymer powder, or a method of continuously feeding the base polymer powder and the surface crosslinking liquid to a mixer which is continuously operated may be used.

The base polymer powder to which the surface crosslinking liquid is applied is subjected to surface crosslinking reaction at a maximum reaction temperature of 140° C. to 200° C. or 170° C. to 195° C. for 5 minutes to 60 minutes, 10 minutes to 50 minutes, or 20 minutes to 45 minutes. More specifically, the surface-crosslinking step may be performed by heat treatment by raising an initial temperature of 20° C. to 130° C. or 40° C. to 120° C. to the maximum reaction temperature for 10 minutes or longer, or 10 minutes to 30 minutes, and maintaining the maximum temperature for 5 minutes to 60 minutes.

By satisfying these surface crosslinking process conditions (in particular, heating conditions and reaction conditions at the maximum reaction temperature), the superabsorbent polymer satisfying the physical properties of one embodiment may be more effectively prepared.

A means for raising the temperature for surface crosslinking reaction is not particularly limited. Heating may be performed by providing a heating medium or by directly providing a heat source. In this regard, the kind of the heating medium applicable may be a hot fluid such as steam, hot air, hot oil or the like, but is not limited thereto. The temperature of the heating medium provided may be properly controlled, considering the means of the heating medium, the heating rate, and the target temperature. Meanwhile, as the heat source provided directly, an electric heater or a gas heater may be used, but the present invention is not limited to these examples.

The superabsorbent polymer obtained according to the above-described preparation method may satisfy more improved liquid permeability and absorption rate while maintaining excellent absorption performances such as centrifuge retention capacity and absorbency under pressure, thereby satisfying the physical properties of one embodiment. Accordingly, the superabsorbent polymer may be appropriately applied to sanitary products such as diapers, particularly, ultra-thin sanitary products with reduced pulp content.

Effect of the Invention

The superabsorbent polymer according to the present invention may exhibit more improved absorption rate and liquid permeability while maintaining excellent basic absorption performances, thereby being preferably applied to sanitary products such as thinner diapers, etc.

BRIEF DESCRIPTION OF DRAWINGS

FIG. 1 is an electron microscopic image showing definition of an aspect ratio of a superabsorbent polymer particle in a superabsorbent polymer of one embodiment and an exemplary method of measuring the same.

DETAILED DESCRIPTION OF THE EMBODIMENTS

Hereinafter, preferred Examples will be provided for better understanding of the present invention. However, these Examples are for illustrative purposes only, and the present invention is not intended to be limited by these Examples.

Example 1

As a manufacturing apparatus of a superabsorbent polymer, a continuous manufacturing apparatus consisting of a polymerization process, a water-containing gel pulverizing process, a drying process, a pulverizing process, a size-sorting process, a surface crosslinking process, a cooling process, a size-sorting process, and a transportation process connecting respective steps was used.

(Step 1)

100 parts by weight of acrylic acid was mixed with 0.4 parts by weight of polyethylene glycol diacrylate (a weight average molecular weight of ~500 g/mol) and allyl(meth)acrylate as internal crosslinking agents, 0.1 part by weight of sodium bicarbonate as a foaming agent, 0.01 parts by weight of sodium lauryl sulfate as a surfactant, and 0.01 part by weight of phenylbis(2,4,6-trimethylbenzoyl)phosphine oxide as a photoinitiator to prepare a monomer solution. Subsequently, while continuously feeding the monomer solution by a metering pump, 160 parts by weight of a 24 wt % aqueous solution of sodium hydroxide was continuously subjected to line mixing to prepare an aqueous monomer solution. Further, 6 parts by weight of a 4 wt % aqueous solution of sodium persulfate was continuously subjected to line mixing, and then continuously fed into a continuous polymerization reactor having a planar polymerization belt with a dam at each end. Thereafter, UV was irradiated to prepare a water-containing gel.

(Step 2)

The water-containing gel was cut to have an average size of about 300 mm or less, and then introduced into a pulverizer (equipped with a perforated plate including a plurality of pores having a diameter of 10 mm), followed by pulverization under respective conditions.

(Step 3)

Subsequently, the water-containing gel pulverized in the step 2 was dried in a drier capable of moving the air volume up and down. The water-containing gel was uniformly dried by allowing hot air of 180° C. to flow upward from downward for 15 minutes so that the water content of the dried powder was about 2% or less, and again allowing the hot air to flow downward from upward for 15 minutes.

(Step 4)

The polymer dried in step 3 was pulverized by a pulverizer and then size-sorted to obtain a base polymer having a size of 150 μm to 850 μm.

(Step 5)

Then, 1 g of ethylene carbonate and 1 g of propylene carbonate were mixed in 4 g of water to prepare a surface crosslinking liquid. The surface tension of the surface crosslinking liquid was measured as 45 mN/m.

6 g of the surface crosslinking liquid was sprayed onto 100 g of the base polymer powder prepared in step 4, and stirred at room temperature to allow uniform distribution of the surface crosslinking liquid on the base polymer powder. Subsequently, the base polymer powder mixed with the surface crosslinking liquid was introduced into a surface crosslinking reactor to perform surface crosslinking reaction.

In the surface crosslinking reactor, the base polymer powder was confirmed to be gradually heated at an initial temperature of about 80° C., and 30 minutes later, allowed to reach the maximum reaction temperature of 190° C. After reaching the maximum reaction temperature, the reaction was further allowed for 15 minutes. Then, a sample of the finally prepared superabsorbent polymer was taken. After the surface crosslinking process, the superabsorbent polymer was size-sorted using an ASTM standard sieve to prepare a superabsorbent polymer having a particle size of 150 μm to 850 μm of Example 1.

The base polymer and the superabsorbent polymer obtained by the above method were analyzed by an electron microscopic image (see FIG. 1, etc.), and an aspect ratio (a/b) of each base polymer powder and superabsorbent polymer particle was calculated. A ratio (% by number) of particles having an aspect ratio of less than 0.5 in the entire base polymer powder and superabsorbent polymer particles was measured. As a result, it was confirmed that the ratio of the particles having an aspect ratio of less than 0.5 in the corresponding base polymer powder and superabsorbent polymer particle was about 10% by number.

Example 2

A superabsorbent polymer of Example 2 was prepared in the same manner as in Example 1, except that 0.15 parts by weight of sodium bicarbonate was used as the foaming agent. The base polymer/superabsorbent polymer obtained by the above method were analyzed by an electron microscopic image, and a ratio (% by number) of particles having an aspect ratio of less than 0.5 in the entire base polymer powder and superabsorbent polymer particles was measured. As a result, it was confirmed that the ratio of the particles having an aspect ratio of less than 0.5 in the corresponding base polymer powder and superabsorbent polymer particle was about 33% by number.

Example 3

A superabsorbent polymer of Example 3 was prepared in the same manner as in Example 1, except that 0.2 parts by weight of sodium bicarbonate was used as the foaming agent. The base polymer/superabsorbent polymer obtained by the above method were analyzed by an electron microscopic image, and a ratio (% by number) of particles having an aspect ratio of less than 0.5 in the entire base polymer powder and superabsorbent polymer particles was measured. As a result, it was confirmed that the ratio of the particles having an aspect ratio of less than 0.5 in the corresponding base polymer powder and superabsorbent polymer particle was about 45% by number.

The subsequent surface crosslinking process was performed in the same manner as in Example 1 to prepare the superabsorbent polymer having a particle size of 150 μm to 850 μm of Example 3.

Example 4

A superabsorbent polymer of Example 4 was prepared in the same manner as in Example 3, except that 0.02 g of polyoxyethylenesorbitan monopalmitate as a lubricant was added to the surface crosslinking liquid in step 5.

Example 5

A superabsorbent polymer of Example 5 was prepared in the same manner as in Example 3, except that 0.3 g of aliphatic alcohol (monostearyl alcohol) as a lubricant was added to the surface crosslinking liquid in step 5.

Example 6

A superabsorbent polymer of Example 6 was prepared in the same manner as in Example 1, except that 0.1 g of polycarboxylic acid-based copolymer as a lubricant which was prepared in the same manner as in Preparation Example 1 of U.S. Pat. No. 1,684,649 was added to the surface crosslinking liquid in step 5.

Example 7

A superabsorbent polymer of Example 7 was prepared in the same manner as in Example 3, except that a surface crosslinking liquid prepared by mixing 1 g of trimethylene carbonate and 1 g of propylene carbonate in 4 g of water was used as the surface crosslinking liquid in step 5.

Comparative Example 1

A base polymer of Comparative Example 1 was prepared in the same manner as in Example 1, except that sodium bicarbonate was not used as the foaming agent in step 1. The base polymer obtained by this method was analyzed by an electron microscopic image, and a ratio (% by number) of particles having an aspect ratio of less than 0.5 in the entire base polymer powder was measured. As a result, it was confirmed that the ratio of the particles having an aspect ratio of less than 0.5 in the corresponding base polymer powder was about 5% by number.

Comparative Example 2

A superabsorbent polymer of Comparative Example 2 was prepared in the same manner as in Comparative Example 1, except that 100 parts by weight of the prepared base polymer powder and 5 g of a surface crosslinking liquid prepared by mixing 1 g of ethylene carbonate in 4 g of water were used. The surface tension of the surface crosslinking liquid was measured as 51 mN/m.

Comparative Example 3

A superabsorbent polymer of Comparative Example 3 was prepared in the same manner as in Example 1, except that 100 parts by weight of the prepared base polymer powder and 5 g of a surface crosslinking liquid prepared by mixing 1 g of ethylene carbonate in 4 g of water were used.

Comparative Example 4

A superabsorbent polymer of Comparative Example 4 was prepared in the same manner as in Example 3, except that 100 parts by weight of the prepared base polymer powder and 5 g of a surface crosslinking liquid prepared by mixing 1 g of ethylene carbonate in 4 g of water were used.

Comparative Example 5

Preparation and drying of the water-containing gel polymer were performed according to a method described in Preparation Example of Korean Patent Publication No. 2015-0132035. Thereafter, a base polymer was prepared and subjected to surface crosslinking according to a method described in Example 1 of Korean Patent Publication No. 2015-0132035, thereby preparing a superabsorbent polymer of Comparative Example 5.

Experimental Example

Physical properties of the respective superabsorbent polymers prepared in Examples and Comparative Examples, and all physical properties during the preparation processes were measured and evaluated by the following methods.

(1) Measurement of Aspect Ratio and Particle Distribution of Base Polymer Powder and Superabsorbent Polymer Particle The shortest diameter (a) and longest diameter (b) of each powder/particle were calculated by electron microscopy as in FIG. 1, and an aspect ratio of each powder/particle was calculated therefrom. A ratio (% by number) of powder/particles having an aspect ratio of less than 0.5 in the entire powder/particles obtained in each of Examples/Comparative Examples was calculated.

(2) Centrifuge Retention Capacity (CRC)

The centrifuge retention capacity (CRC) by water absorption capacity under no load was measured in accordance with EDANA (European Disposables and Nonwovens Association) standard test method WSP 241.3. After uniformly introducing $W_0(g)$ (about 0.2 g) of the superabsorbent polymer in a nonwoven fabric-made bag and sealing the same, it was immersed in a physiological saline solution composed of 0.9 wt % aqueous solution of sodium chloride at room temperature. After 30 minutes, the bag was dehydrated by using a centrifuge at 250 G for 3 minutes, and then the weight $W_2(g)$ of the bag was measured. Further, after carrying out the same operation without using the superabsorbent polymer, the weight $W_1(g)$ of the bag was measured. CRC (g/g) was calculated by using the obtained weight values according to the following Calculation Formula 1, thereby confirming the centrifuge retention capacity.

$$CRC(g/g) = \{[W_2(g) - W_1(g) - W_0(g)]/W_0(g)\} \quad \text{[Calculation Formula 1]}$$

(3) Absorbency Under Pressure (AUP)

The absorbency under pressure (AUP) of the superabsorbent polymers of Examples and Comparative Examples was measured in accordance with EDANA (European Disposables and Nonwovens Association) standard test method WSP 242.3.

First, a 400 mesh stainless steel net was installed in the cylindrical bottom of a plastic having an internal diameter of 60 mm. $W_0$(g, 0.90 g) of each of the superabsorbent polymers of Examples 1 to 6 and Comparative Examples 1 to 4 was uniformly scattered on the steel net under conditions of temperature of 23±2° C. and relative humidity of 45%, and a piston which can uniformly provide a load of 4.83 kPa (0.7 psi) was put thereon. The external diameter of the piston was slightly smaller than 60 mm, there was no gap between the cylindrical internal wall and the piston, and the jig-jog of the cylinder was not interrupted. At this time, the weight $W_3$(g) of the apparatus was measured.

After putting a glass filter having a diameter of 125 mm and a thickness of 5 mm in a Petri dish having a diameter of 150 mm, a physiological saline solution composed of 0.90 wt % sodium chloride was poured in the dish until the surface level became equal to the upper surface of the glass filter. The measuring apparatus was put on the glass filter and the solution was absorbed under a load for about 1 hour. After 1 hour, the weight $W_4$(g) was measured after lifting up the measuring apparatus.

Using the respective weights thus obtained, AUP(g/g) was calculated according to the following Calculation Formula 2, thereby confirming the absorbency under pressure.

$$AUP(g/g) = [W_4(g) - W_3(g)]/W_0(g) \quad \text{[Calculation Formula 2]}$$

in Calculation Formula 2, $W_0$(g) is an initial weight (g) of the superabsorbent polymer, $W_3$(g) is the total sum of a weight of the superabsorbent polymer and a weight of the apparatus capable of providing a load for the superabsorbent polymer, and $W_4$(g) is the total sum of a weight of the superabsorbent polymer and a weight of the apparatus capable of providing a load to the superabsorbent polymer, after immersing the superabsorbent polymer in a physiological saline solution under a load (0.7 psi) for 1 hour.

(4) Saline Flow Conductivity (SFC)

The saline flow conductivity (SFC) was measured and calculated according to the methods disclosed in columns 54 to 59 of U.S. Pat. No. 5,562,646.

(5) 30-Sec Absorption Rate 30-sec absorption rate and porosity were measured by swelling about 0.16 g of the superabsorbent polymer in a physiological saline solution fed through a mesh in the bottom of a cylindrical cylinder under a pressure of 0.3 psi. A change of a height of an upper plate of a rheometer according to volume expansion of the superabsorbent polymer was measured in real time, and from a value obtained by dividing the height of the upper plate at 30 sec by the absorption time (30 sec), the 30-sec absorption rate was measured and calculated. Further, porosity was calculated by the following method: when swelling of the superabsorbent polymer was completed, the total volume inside the cylinder (final absorption height*the bottom area of the cylindrical cylinder) was calculated, and from this value, the amount of the physiological saline solution absorbed by the superabsorbent polymer which was measured by a water content meter was subtracted.

(6) Surface Tension of Surface Crosslinking Liquid and Superabsorbent Polymer

All procedures were carried out in a constant temperature and humidity room (temperature of 23±0.5° C., relative humidity of 45±0.5%).

First, the surface crosslinking liquid was pipetted and transferred to another clean cup, and then the surface tension of the surface crosslinking liquid was measured by using a tensiometer (surface tensionmeter Kruss K11/K100).

Next, the surface tension of the superabsorbent polymer was measured as follows. 150 g of physiological saline composed of 0.9 wt % sodium chloride was put in a 250 mL beaker, and directly stirred with a magnetic bar. 1.0 g of the superabsorbent polymer was added to the solution under stirring, and stirred for 3 minutes. Stirring was stopped and the swollen superabsorbent polymer was allowed to settle to the bottom for 15 minutes or longer.

Then, the supernatant (the solution just below the surface) was pipetted and transferred to another clean cup and measured using a tensiometer (surface tensionmeter Kruss K11/K100).

The values of physical properties of Examples 1 to 7 and Comparative Examples 1 to 5 which were measured by the above methods are summarized and shown in Table 1 below.

TABLE 1

| Unit | Surface tension (surface crosslinking liquid) mN/m | Particle distribution (aspect ratio of less than 0.5) % by number | CRC g/g | AUP g/g | Absorbency g/g | SFC $\cdot 10^{-7}$ cm$^3 \cdot$ s/g | 30-sec absorption rate mm/min | Surface tension (superabsorbent polymer) mN/m |
|---|---|---|---|---|---|---|---|---|
| Example 1 | 45 | 10 | 28.3 | 25.0 | 53.3 | 53 | 1.9 | 70 |
| Example 2 | 45 | 33 | 28.0 | 24.6 | 52.6 | 50 | 2.2 | 68 |
| Example 3 | 45 | 45 | 26.4 | 24.8 | 51.2 | 49 | 2.4 | 66 |
| Example 4 | 33 | 45 | 27.9 | 25.4 | 53.3 | 42 | 2.4 | 60 |
| Example 5 | 33 | 45 | 27.0 | 25.3 | 52.3 | 50 | 2.4 | 60 |
| Example 6 | 42 | 10 | 27.6 | 24.5 | 52.1 | 50 | 1.9 | 69 |
| Example 7 | 45 | 45 | 27.7 | 24.1 | 51.8 | 43 | 1.9 | 66 |
| Comparative Example 1 | 45 | 5 | 27.7 | 25.7 | 53.4 | 46 | 1.4 | 70 |
| Comparative Example 2 | 51 | 5 | 28.7 | 24.7 | 53.4 | 44 | 1.4 | 71 |
| Comparative Example 3 | 51 | 10 | 27.8 | 23.2 | 51 | 20 | 1.7 | 69 |
| Comparative Example 4 | 51 | 45 | 27.7 | 23.0 | 50.7 | 25 | 2.4 | 68 |
| Comparative Example 5 | 45 | 2 | 33.1 | 24.2 | 57.3 | 5 | 0 | 70 |

Referring to Table 1, Examples 1 to 7 were confirmed to satisfy predetermined particle distributions and to exhibit excellent liquid permeability defined as 35 ($\cdot 10^{-7}$ cm$^3\cdot$s/g) or more. It was also confirmed that Examples 1 to 7 showed excellent basic absorption performances defined by absorbency, etc., and also showed optimized particle distributions while having excellent liquid permeability, thereby showing excellent absorption rate defined by 30-sec absorption rate.

In contrast, one or more of liquid permeability and absorption rate were poor in Comparative Examples 1 to 5, as compared with Examples.

The invention claimed is:

1. A superabsorbent polymer comprising:
a base polymer powder including a first crosslinked polymer comprising a water-soluble ethylene-based unsaturated monomer having acidic groups which are at least partially neutralized; and
a surface crosslinked layer which is formed on the base polymer powder and which includes a second crosslinked polymer comprising the first crosslinked polymer which is additionally crosslinked via a surface crosslinking agent,
wherein the superabsorbent polymer includes 10% by number to 50% by number of superabsorbent polymer particles having an aspect ratio of less than 0.5, based on a total number of superabsorbent polymer particles,
wherein the aspect ratio is defined as the shortest diameter/the longest diameter of the superabsorbent polymer particle, and
the superabsorbent polymer has a saline flow conductivity (SFC) of 30·10$^{-7}$ cm$^3$·s/g or more, wherein the saline is a 0.685% by weight of an aqueous solution of sodium chloride.

2. The superabsorbent polymer of claim 1, wherein absorbency represented by the following Equation 1 is 46 g/g to 63 g/g:

Absorbency=CRC+AUP  [Equation 1]

in Equation 1, CRC represents centrifuge retention capacity of the superabsorbent polymer for a physiological saline solution comprising 0.9 wt % aqueous solution of sodium chloride, for 30 minutes, and
AUP represents absorbency under pressure of 0.7 psi of the superabsorbent polymer for the physiological saline solution for 1 hour.

3. The superabsorbent polymer of claim 2, wherein the CRC is 25 g/g to 35 g/g.

4. The superabsorbent polymer of claim 2, wherein the AUP is 21 g/g to 27 g/g.

5. The superabsorbent polymer of claim 1, wherein a 30-sec absorption rate for a physiological saline solution under a pressure of 0.3 psi is 1.5 mm/min or more.

6. The superabsorbent polymer of claim 1, wherein a surface tension is 60 mN/m to 75 mN/m.

7. The superabsorbent polymer of claim 1, wherein the surface crosslinking agent includes two or more kinds of alkylene carbonates having 2 to 5 carbon atoms, in which each of the two or more kinds of the alkylene carbonates have different carbon numbers.

8. The superabsorbent polymer of claim 1, wherein the water-soluble ethylene-based unsaturated monomer includes one or more of an anionic monomer selected from acrylic acid, methacrylic acid, maleic anhydride, fumaric acid, crotonic acid, itaconic acid, 2-acryloylethane sulfonic acid, 2-methacryloylethane sulfonic acid, 2-(meth)acryloylpropane sulfonic acid, or 2-(meth)acrylamide-2-methyl propane sulfonic acid, and salts thereof; a nonionic hydrophilic monomer selected from (meth)acrylamide, N-substituted (meth)acrylate, 2-hydroxyethyl(meth)acrylate, 2-hydroxypropyl(meth)acrylate, methoxy polyethylene glycol (meth) acrylate, or polyethylene glycol (meth)acrylate; or an amino group-containing unsaturated monomer selected from (N,N)-dimethylaminoethyl(meth)acrylate or (N,N)-dimethylaminopropyl(meth)acrylate, and a quaternary compound thereof.

9. The superabsorbent polymer of claim 1, wherein a 30-sec absorption rate for a physiological saline solution under a pressure of 0.3 psi is 1.7 mm/min to 3.0 mm/min.

10. A method of preparing a superabsorbent polymer of claim 1, comprising:
carrying out a crosslinking polymerization of a water-soluble ethylene-based unsaturated monomer having acidic groups which are at least partially neutralized, in the presence of a foaming agent and an internal crosslinking agent to form a water-containing gel polymer including a first crosslinked polymer;
gel-pulverizing, drying, pulverizing, and size-sorting the water-containing gel polymer to form a base polymer including 10% by number to 50% by number of base polymer powder having an aspect ratio of less than 0.5, the aspect ratio defined as the shortest diameter/the longest diameter of the base polymer powder; and
carrying out a surface crosslinking of the base polymer by heat treatment in the presence of a surface crosslinking liquid containing a surface crosslinking agent and a liquid medium and having a surface tension of 30 mN/m to 50 mN/m at a temperature of 20° C. to 25° C.

11. The method of claim 10, wherein the internal crosslinking agent comprises:
a first internal crosslinking agent of poly(meth)acrylate of polyol;
a second internal crosslinking agent of allyl(meth)acrylate; and
a total content of the first and second internal crosslinking agents is 0.01 parts by weight to 2 parts by weight, based on 100 parts by weight of a monomer composition including the internal crosslinking agents and the water-soluble ethylene-based unsaturated monomer.

12. The method of claim 10, wherein the foaming agent includes one or more of sodium bicarbonate, sodium carbonate, potassium bicarbonate, potassium carbonate, calcium bicarbonate, calcium carbonate, magnesium bicarbonate, or magnesium carbonate.

13. The method of claim 10, wherein the surface crosslinking agent included in the surface crosslinking liquid comprises two or more kinds of alkylene carbonates having 2 to 5 carbon atoms, in which each of the two or more kinds of the alkylene carbonates have different carbon numbers.

14. The method of claim 13, wherein the surface crosslinking liquid further includes a surfactant.

15. The method of claim 13, wherein the surface crosslinking liquid further includes a polycarboxylic acid-based copolymer having repeating units represented by the following Chemical Formula 1-a and Chemical Formula 1-b:

[Chemical Formula 1-a]

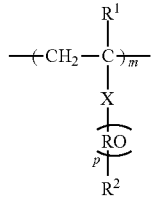

[Chemical Formula 1-b]

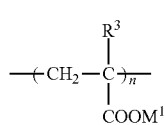

in Chemical Formulae 1-a and 1-b, $R^1$, $R^2$ and $R^3$ are each independently hydrogen or an alkyl group having 1 to 6 carbon atoms, RO is an oxyalkylene group having 2 to 4 carbon atoms, $M^1$ is hydrogen or a monovalent metal or non-metal ion, X is —COO—, an alkyloxy group having 1 to 5 carbon atoms, or an alkyldioxy group having 1 to 5 carbon atoms, m is an integer of 1 to 100, n is an integer of 1 to 1000, and p is an integer of 1 to 150, wherein when p is two or more, two or more of the repeating —RO— are the same as or different from each other.

16. The method of claim 13, wherein the liquid medium of the surface crosslinking liquid further includes an aliphatic alcohol having 6 or more carbon atoms.

17. The method of claim 10, wherein the surface-crosslinking of the base polymer is performed by heat treatment by raising an initial temperature of 20° C. to 130° C. to a maximum reaction temperature of 140° C. to 200° C. for 10 minutes to 30 minutes, and maintaining the maximum temperature for 5 minutes to 60 minutes.

* * * * *